United States Patent
Baker et al.

(10) Patent No.: US 8,146,054 B2
(45) Date of Patent: Mar. 27, 2012

(54) HYBRID DATA OBJECT MODEL

(75) Inventors: Ronald Bruce Baker, Wake Forest, NC (US); Jinfang Chen, Austin, TX (US); Benjamin Nelson Jeffcoat, Raleigh, NC (US); Sushma Bharat Patel, Austin, TX (US); Shaw-Ben Shepherd Shi, Austin, TX (US)

(73) Assignee: International Business Machines Corporation, Armonk, NJ (US)

( * ) Notice: Subject to any disclaimer, the term of this patent is extended or adjusted under 35 U.S.C. 154(b) by 1505 days.

(21) Appl. No.: 11/609,741

(22) Filed: Dec. 12, 2006

(65) Prior Publication Data

US 2008/0141003 A1 Jun. 12, 2008

(51) Int. Cl.
*G06F 9/44* (2006.01)
*G06F 9/45* (2006.01)
*G06F 17/30* (2006.01)

(52) U.S. Cl. ........ 717/116; 717/108; 717/151; 707/796; 719/332

(58) Field of Classification Search ........................ None
See application file for complete search history.

(56) References Cited

U.S. PATENT DOCUMENTS

| | | | | |
|---|---|---|---|---|
| 5,481,718 A * | 1/1996 | Ryu et al. | | 719/316 |
| 6,493,719 B1 * | 12/2002 | Booth et al. | | 1/1 |
| 6,879,999 B2 * | 4/2005 | Elnozahy | | 709/219 |
| 7,328,215 B2 * | 2/2008 | Stumpf | | 707/797 |
| 7,380,249 B2 * | 5/2008 | Hudis et al. | | 719/316 |
| 7,647,298 B2 * | 1/2010 | Adya et al. | | 707/999.002 |
| 7,743,041 B2 * | 6/2010 | Shultz et al. | | 707/705 |
| 7,908,269 B2 * | 3/2011 | Tiemann et al. | | 707/726 |
| 2002/0188631 A1 * | 12/2002 | Tiemann et al. | | 707/513 |
| 2003/0172078 A1 * | 9/2003 | Stumpf | | 707/100 |
| 2004/0064805 A1 * | 4/2004 | Sparago et al. | | 717/120 |
| 2004/0122826 A1 * | 6/2004 | Mackie | | 707/100 |
| 2005/0071354 A1 * | 3/2005 | Cameron et al. | | 707/100 |
| 2006/0026145 A1 * | 2/2006 | Beringer et al. | | 707/3 |
| 2006/0143227 A1 * | 6/2006 | Helm et al. | | 707/103 Y |
| 2006/0179036 A1 * | 8/2006 | Broker | | 707/3 |
| 2006/0195779 A1 * | 8/2006 | McElroy et al. | | 715/501.1 |
| 2006/0294463 A1 * | 12/2006 | Chu et al. | | 715/703 |
| 2007/0011126 A1 * | 1/2007 | Conner et al. | | 706/47 |
| 2007/0016575 A1 * | 1/2007 | Hurst-Hiller et al. | | 707/5 |
| 2007/0282856 A1 * | 12/2007 | Mueller et al. | | 707/10 |

OTHER PUBLICATIONS

Beatty et al., Next-Generation Data Programming: Service DATa Objects, Nov. 2003 pp. 1-15.*
Adams et al., Service DAta Objects for Java Specification version 2.1.0 Nov. 2006.*

* cited by examiner

*Primary Examiner* — Tuan Dam
*Assistant Examiner* — Zheng Wei
(74) *Attorney, Agent, or Firm* — Yee & Associates, P.C.; Jeffrey S. LaBaw

(57) ABSTRACT

Computer implemented method, system and computer usable program code for processing a data object, for example, for searching for, creating or updating a data object. A computer implemented method for processing a data object includes receiving a request for the data object. A static portion and a dynamic portion for the data object are determined, and an instruction for the static portion and an instruction for the dynamic portion are processed separately. To search for a data object, a result from processing an instruction for the static portion and a result from processing the instruction for the dynamic portion are merged to form a hybrid data object. To create or update a data object, a result from processing an instruction for the static portion and a result from processing the instruction for the dynamic portion is saved in a database.

18 Claims, 8 Drawing Sheets

HYBRID DATA OBJECT MODEL

BACKGROUND OF THE INVENTION

1. Field of the Invention

The present invention relates generally to the data processing field and, more particularly, to a computer implemented method, system and computer usable program code for searching for, creating and updating a data object.

2. Description of the Related Art

Information Technology Infrastructure Library (ITIL) is a framework of best practice approaches intended to facilitate the delivery of high quality information technology (IT) services. In order to facilitate the integration and automation of ITIL best practices, ITIL specifies the use of CMDB (Configuration Management Database) to leverage a single source of information. A CMDB is a unified or federated repository of information related to all the components of an information system. The IBM Tivoli® CMDB, for example, is a fundamental software component that provides a specific level of data integration across Tivoli products.

A CMDB tends to be a highly customized part of a customer's IT operational environment. While CMDB provides a significant number of class types for customers to store configuration and product related information, customers will typically have additional data which they would like to include in their own environment. The ability to be able to extend the CMDB is an important feature for a successful CMDB product.

CMDB extensions can be classified into two main categories:
1. Static (Optimized) extensions—This approach requires new code to be added to both client and server.
2. Dynamic (Generic) extensions—This approach does not require new code to be added.

Currently, CMDB implements predefined configuration and process related attributes as CMDB static transfer objects which is similar to static SDO (Service Data Objects). SDO is a Java-based data programming model and architecture for accessing and updating data. These static transfer objects provide good performance; however, they provide little flexibility. They require attribute names and data types to be known at compilation time, and provide the static extensions.

In order to enable customers to add additional configuration and process related attributes in their own environments, it is necessary for CMDB to provide a dynamic extension solution. Such a solution should involve a generic extension approach that does not require new code to be added, and does not require recompilation/deployment of the product. A dynamic SDO data object provides flexibility by providing a generic API (Application Programming Interface) and runtime data type binding. However, it also introduces performance overhead. In addition, by switching to a purely dynamic SDO data object implementation, it is necessary to rewrite a significant amount of code.

There is, accordingly, a need for a mechanism to enable a CMDB database to be extended in an efficient, flexible manner to facilitate searching, creating and updating a data object.

SUMMARY OF THE INVENTION

Exemplary embodiments provide a computer implemented method, system and computer usable program code for processing a data object, for example, for searching for, creating or updating a data object. A computer implemented method for processing a data object includes receiving a request for the data object. A static portion and a dynamic portion for the data object are determined, and an instruction for the static portion and an instruction for the dynamic portion are processed separately. To search for a data object, a result from processing an instruction for the static portion and a result from processing the instruction for the dynamic portion are merged to form a hybrid data object. To create or update a data object, a result from processing an instruction for the static portion and a result from processing the instruction for the dynamic portion is saved in a database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

DETAILED DESCRIPTION OF THE PREFERRED EMBODIMENT

Figure 1:
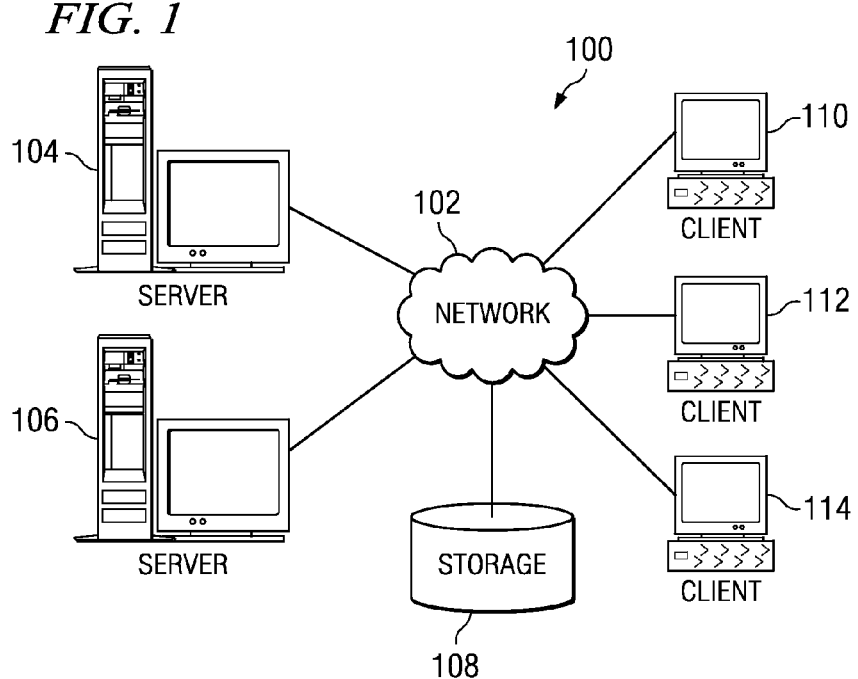
FIG. 1 illustrates a network of data processing systems, in which exemplary embodiments may be implemented.
Figure 2:
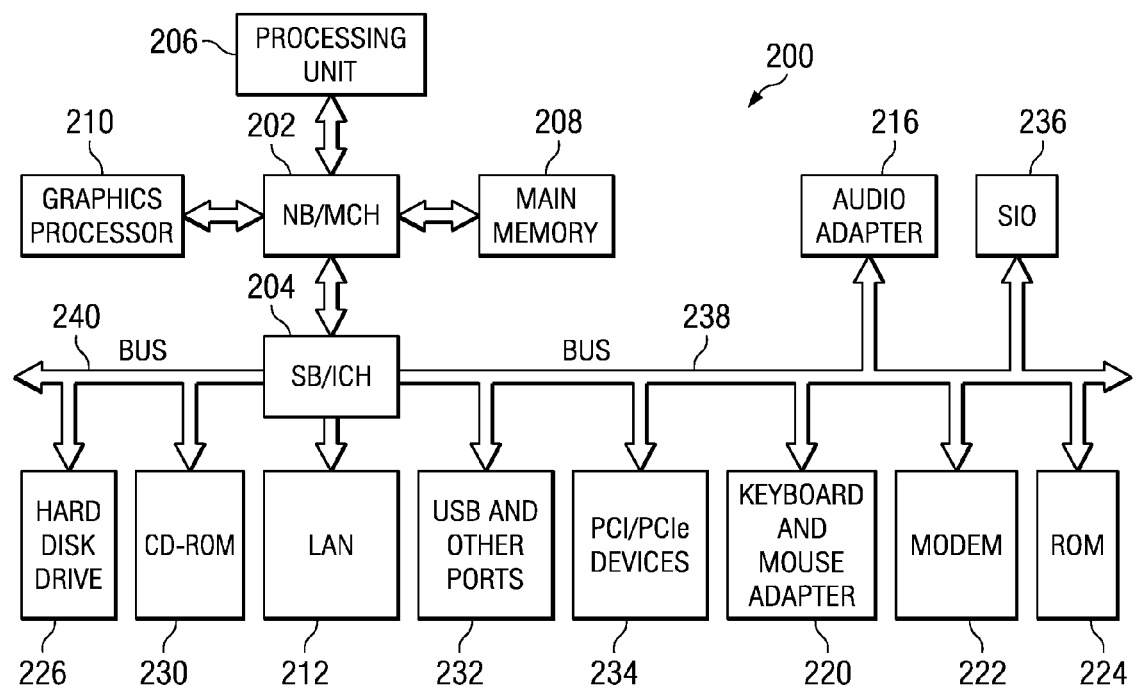
FIG. 2 is a block diagram of a data processing system, in which exemplary embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for processing a data object, for example, for searching for, creating or updating a data object. A computer implemented method for processing a data object includes receiving a request for the data object. A static portion and a dynamic portion for the data object are determined, and an instruction for the static portion and an instruction for the dynamic portion are processed separately. To search for a data object, a result from processing an instruction for the static portion and a result from processing the instruction for the dynamic portion are merged to form a hybrid data object. To create or update a data object, a result from processing an instruction for the static portion and a result from processing the instruction for the dynamic portion is saved in a database.

In general, the exemplary embodiments provide an extended data object that is composed of both static and dynamic components. The exemplary embodiments take advantage of benefits of a static CMDB transfer object and a SDO dynamic data object to create a hybrid data object model for CMDB.

Each hybrid data object has two sections, a static section and a dynamic section. The static section includes a predefined common configuration and process class type attributes. The static section provides the baseline and valuable attributes to all users. The name and data type of these attributes are known at development time. The dynamic section provides flexibility to users to add needed attributes after a program is deployed, i.e., the newly added attributes are unknown at development time. Exemplary embodiments also maximize the CMDB transfer data object model for the predefined attributes, and, at the same time, take advantage of dynamic SDO data object model to provide flexibility to allow customers using generic APIs to set/get attributes after a program has been deployed.

Figure 3:
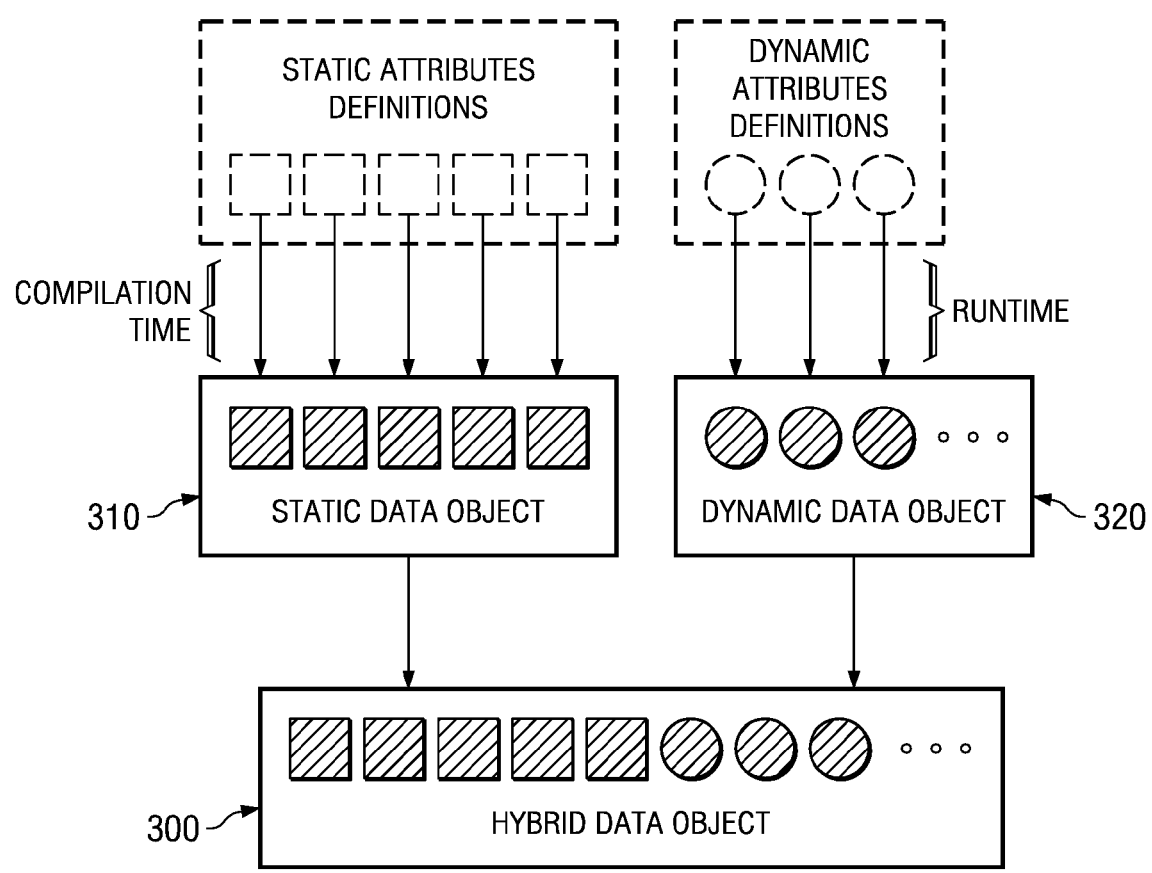
FIG. 3 schematically illustrates a hybrid data object model in accordance with an exemplary embodiment.

FIG. 3 schematically illustrates a hybrid data object model in accordance with an exemplary embodiment. The hybrid data object model is generally designated by reference number 300, and includes static data object 310, represented by squares, and dynamic data object 320, represented by circles. Data objects are the building blocks for object-oriented computer programming. A data object is an individual unit of data storage, with each data object including at least one data member. Each data object executes a set of instructions and has the capability of storing data, receiving messages, processing data, and sending messages.

As shown in FIG. 3, static data object 310 is a set of data objects that are predefined or are known prior to executing a set of instructions, i.e., that are defined at compilation time. Dynamic data object 320, on the other hand, is a set of data objects that are defined at runtime and that are used as the basic building blocks of programs. Each object is capable of receiving messages, processing data and sending messages to other objects. Exemplary embodiments merge the static and dynamic data objects into hybrid data object 300.

Figure 4A:
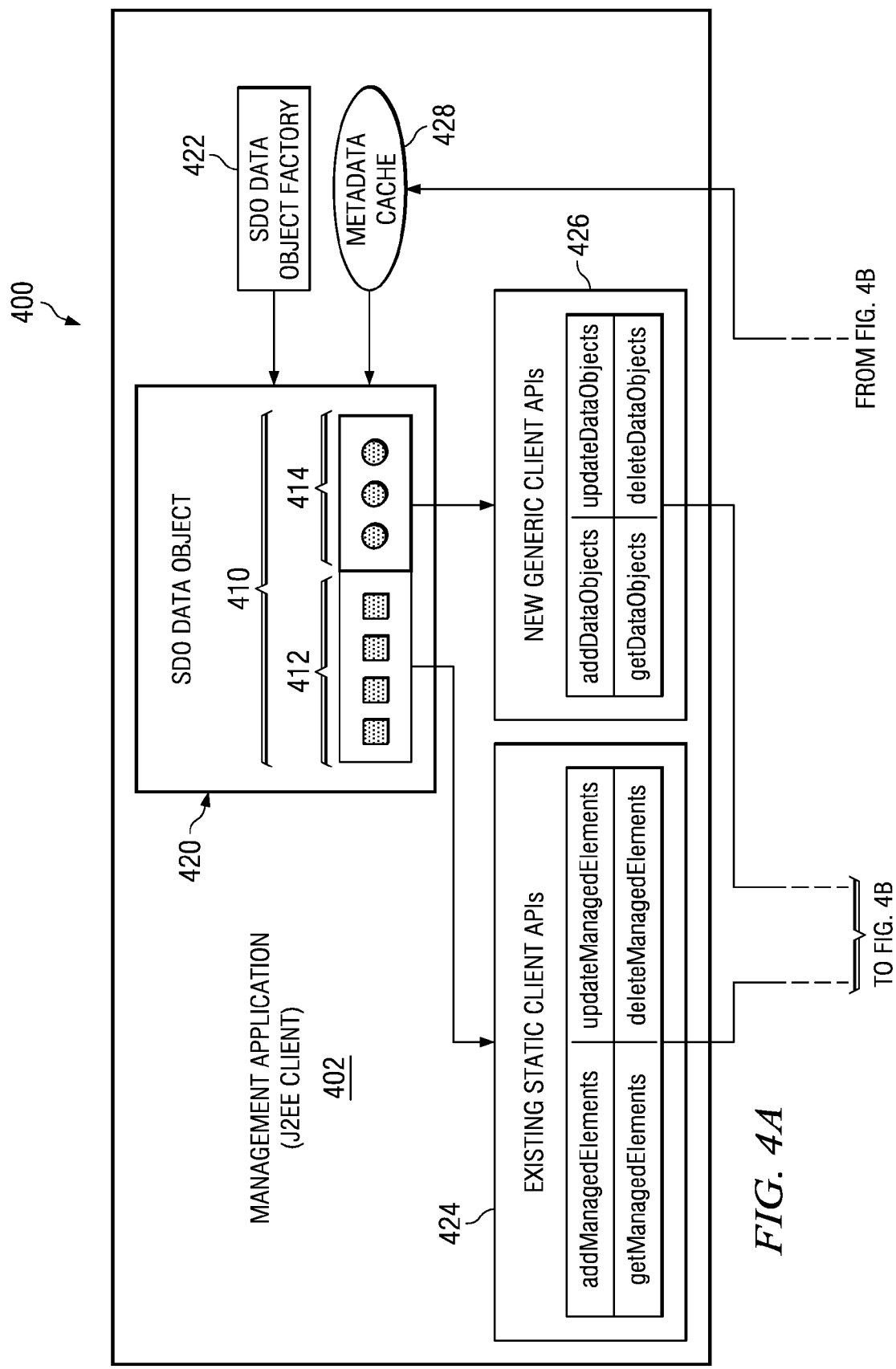
FIGS. 4A and 4B together show a block diagram that schematically illustrates a system overview of a CMDB hybrid data object model according to an exemplary embodiment.
Figure 4B:
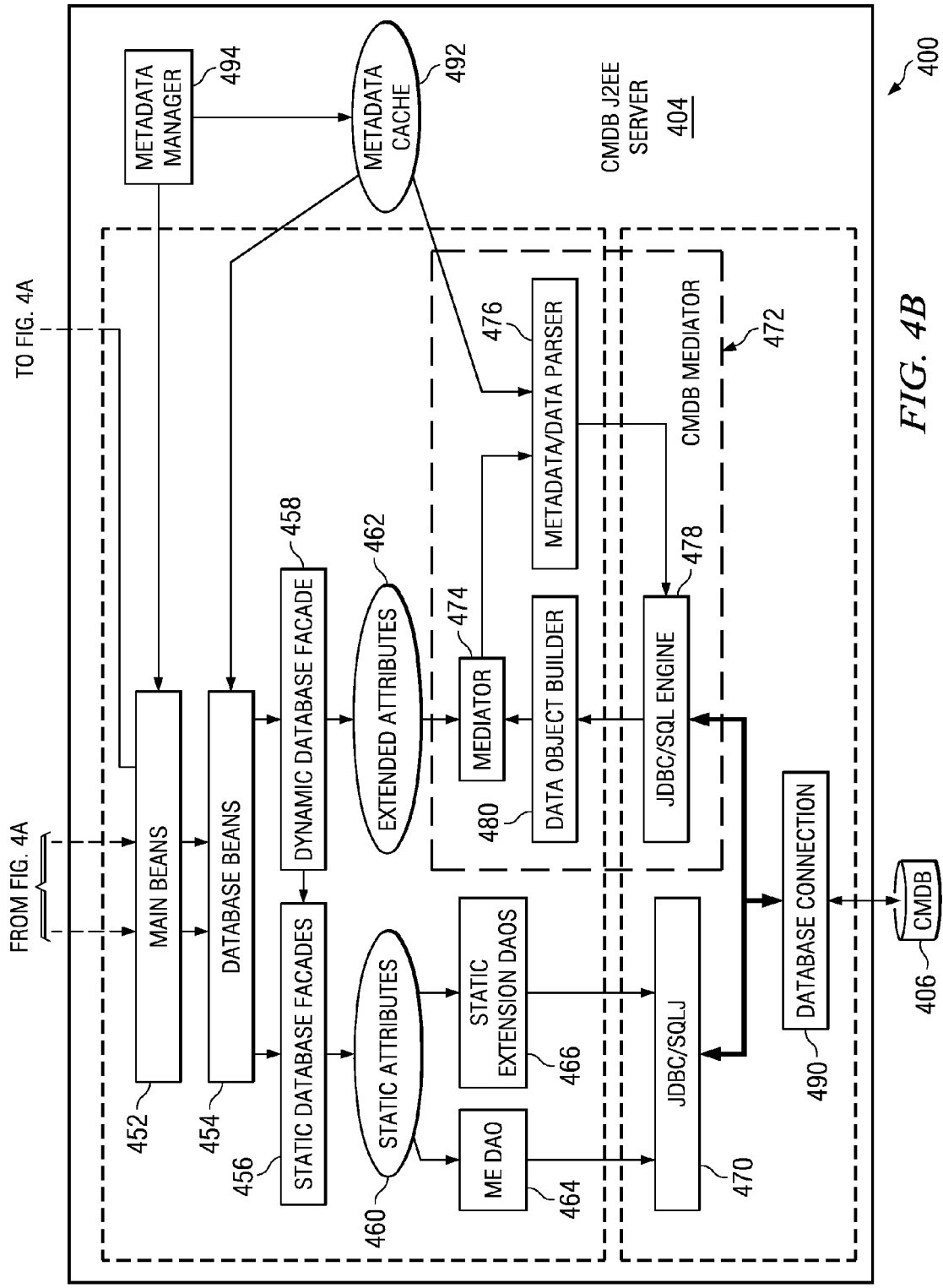

FIGS. 4A and 4B together show a block diagram that schematically illustrates a system overview of a CMDB hybrid data object model according to an exemplary embodiment. The system is generally designated by reference number 400 and includes management application 402 (J2EE client), CMDB J2EE server 404 and CMDB 406.

Management application 402 generally includes SDO data object 420, SDO Data Object Factory 422, existing static client APIs 424, new generic client APIs 426, and metadata cache 428.

SDO data object 420 is an enhancement of the current CMDB transfer object (i.e., CdbManagedElement and subclasses). By providing SDO features on the existing transfer object, existing static clients and new dynamic clients use the same transfer object implementation, which eases the transition to the dynamic interfaces by existing static clients. With this implementation, some data is stored statically in the transfer object (e.g., predefined attributes of managed element like "description"), and extended attributes are stored dynamically. The generic SDO interface can be used for all attributes, however, including predefined attributes. The CMDB transfer object is extended to the hybrid data object and provides useful methods for CMDB users. For example, SDO data object 420 provides a single API call to provide a group of attribute names and values of a class type in HashMap format. This provides a convenient and efficient way to get name-value pair information for users who do not need data type information.

SDO Data Object Factory 422 comprises a factory used by new generic client APIs 426 to obtain SDO data objects of a particular type. This prevents new CMDB API clients from having to statically bind to any particular transfer object implementation. Generic clients can ask SDO Data Object Factory 422 for an SDO Data Object of a particular type (e.g., "ComputerSystem"), and SDO Data Object Factory 422 will return a SDO Data Object of the requested type (e.g., a CdbComputerSystem). Each instance of the class type is a hybrid SDO data object 410 that includes static components 412 and dynamic components 414 as illustrated in FIGS. 4A and 4B. Inasmuch as all transfer objects implement an SDO Data Object interface, generic clients are never aware that they are dealing with a particular implementation class (e.g., CdbComputerSystem). Rather, they only know they are dealing with an SDO Data Object interface.

Existing static client APIs 424 are provided for client management applications and end-users to take action on core class types and extensions. These include:
1. Insertion of data into CMDB.
2. Retrieval of all the data of a class type using the GUID, MSSGUID, GUID and MSSGUID, or neither from CMDB.
3. Update of one or more rows of data in CMDB based on the user's input.
4. Deletion of data from CMDB.

New generic client APIs 426 are provided for the client management application and end-users to:
1. Insert data into CMDB.
2. Get data from CMDB based on user-defined conditions.
3. Update one or more rows of data in CMDB based on user input.
4. Delete one or more rows of data in CMDB based on user-defined conditions, internal and customer extensions, and core class types and extensions.

Metadata cache 428 stores client meta-data information and is used by SDO client APIs to perform data type checking. At client start-up time, SDO Client APIs create the meta-data cache by using Meta-Data Manager APIs and store it in memory. The meta-data cache will be refreshed only when the SDO Client APIs detect a new class type or attribute type. It is intended to avoid the necessity of frequent Meta-Data Manager APIs client-server calls so as to improve efficiency.

Static and generic client APIs 422 and 424 send a request and input data as a list of SDO data objects through RMI/IIOP (Java RMI interface over CORBA system) to CMDB J2EE server 404. CMDB server 404 processes the request, takes necessary database actions and sends the returning data as a list of SDO data objects back to the client based on the type of client API calls. The existing static client APIs continue to work with the new SDO data objects because the SDO data objects are implemented as CdbManagedElement transfer objects which are understood by the static client APIs.

Main Beans 452 provide a non-transactional, remote interface to all CMDB APIs. Main beans 452 delegate work to database beans 454. Database Beans 454 provide a transactional, local interface to all CMDB APIs. The database beans 454 perform parameter checking, database connection handling, and exception handling. The database beans 454 delegate work to database facades 456 and 458.

Static database facades 456 are existing database facades in CMDB that process static attributes, including core managed element and CI attributes as well as statically defined extension classes and attributes. Both static and generic APIs update all core and statically defined extension classes and attributes using existing static database facades 456.

Dynamic database facade 458 is a new database facade for processing dynamic attributes. The generic APIs will update all core and statically defined extension classes and attributes using existing static database facades 456, and then use the dynamic database facade 458 to process dynamic attributes.

Static Attributes 460 is a group of static attributes created for the core class types by a development team. The client request of these attributes will be handled by ME (Managed Element) and Core Class Type DAOs (Data Access Objects).

All class types include the common managed elements attributes. They are stored in separate predefined tables in CMDB, for example MNGD_ELEMENT. For add/update requests of all the core class types, ME DAO (Managed Element Data Access Object) 464 is used to handle the managed elements attributes.

For statically defined extensions, there is one DAO created for each extension class type, referred to as "Static extension DAOs" 466). They are used to handle the requests of the static attributes of core extension class types, together with the ME DAO 466. For example, if the client request is to add ComputerSystem data, ME DAO 464 and the ComputerSystem DAO (one of DAOs 466) will be used to handle the request related to all the static attributes defined in the ComputerSystem class.

Extended Attributes 462 are new extended attributes created for the core class types or new extended class types by other product teams or customers. The client request of these attributes via the new generic APIs will be handled by the SDO component.

JDBC/SQLJ 470 (JDBC is the industry standard for database-independent connectivity between the Java programming language and a wide range of databases, and SQLJ is an ISO standard for embedding SQL statements in Java programs) is used by static extension DAOs 466 and ME DAO 464 to take database actions.

In accordance with an exemplary embodiment, CMDB Mediator 472 is implemented as an SQL generator that forms an SQL statement at runtime based on a client request, including the CMDB object, meta-data object and filter object information. The generator dynamically creates the following categories of SQL statements: select insert and update. (Delete is not needed in this implementation because the core delete SQL statements will automatically delete extension data rows due to cascade deletes.)

CMDB mediator 472 has four sub-components including mediator 474, metadata/data parser 476, JDBC/SQL engine 478 and data object builder 480.

Database connection 490 to CMDB database 406 is obtained from a connection pool. If more than one component is used to interact with database data for each class type, one single database connection is used for one transaction to ensure the data consistency. For example, in order to handle a request for an extended core class type with dynamically extended attributes, ME DAO 464, static extension DAO 466, and SDO components will all be used, but only one database connection is used for the transaction.

Server meta-data information is stored in meta-data cache 492 and is used by database bean 454 to differentiate the core and dynamic extended class types and to process client request parameters and convert results set to SDO data objects. Metadata cache 492 is managed by metadata manager 494.

Figure 5:
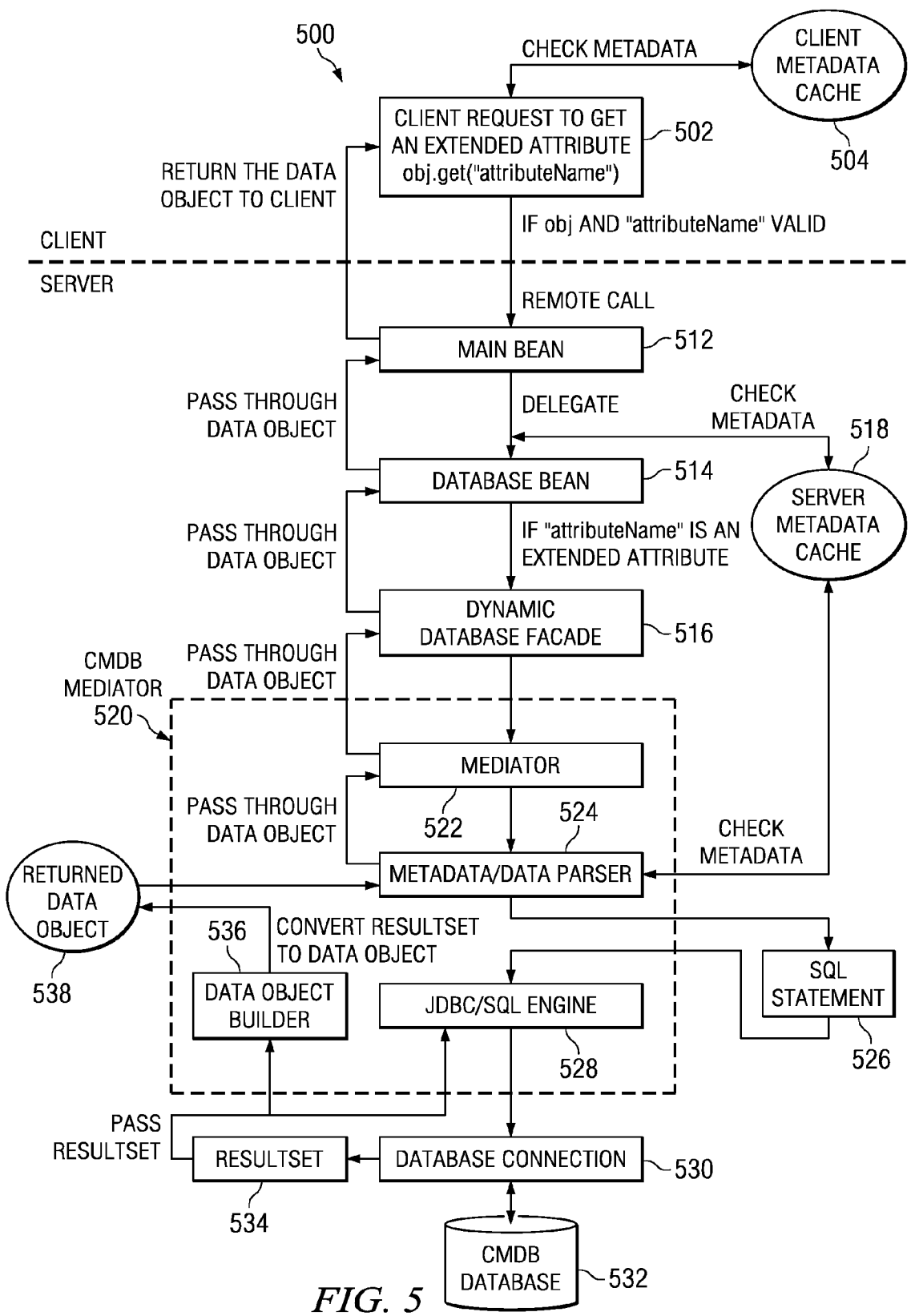
FIG. 5 is a diagram that schematically illustrates a "Get Extended Attribute" workflow according to an exemplary embodiment.

FIG. 5 is a diagram that schematically illustrates a "Get Extended Attribute" workflow according to an exemplary embodiment. The workflow is generally designated by reference number 500, and begins by a client request to get an extended attribute as shown at 502. If the object and attribute name are determined as valid using client metadata cache 504, the request is received at the server by main bean 512 and is delegated to database bean 514, and then passed to dynamic database facade 516 after checking server metadata cache 518 to determine if the attribute name is an extended attribute.

The data object then passes to CMDB mediator 520, including mediator 522, and metadata/data parser 524 to form SQL statement 526. JDBC/SQL engine 528 takes database actions via database connection 530 to CMDB database 532. The resultset 534 is converted to a data object by data object builder 536 and the data object is returned to the client as shown at 538.

Figure 6A:
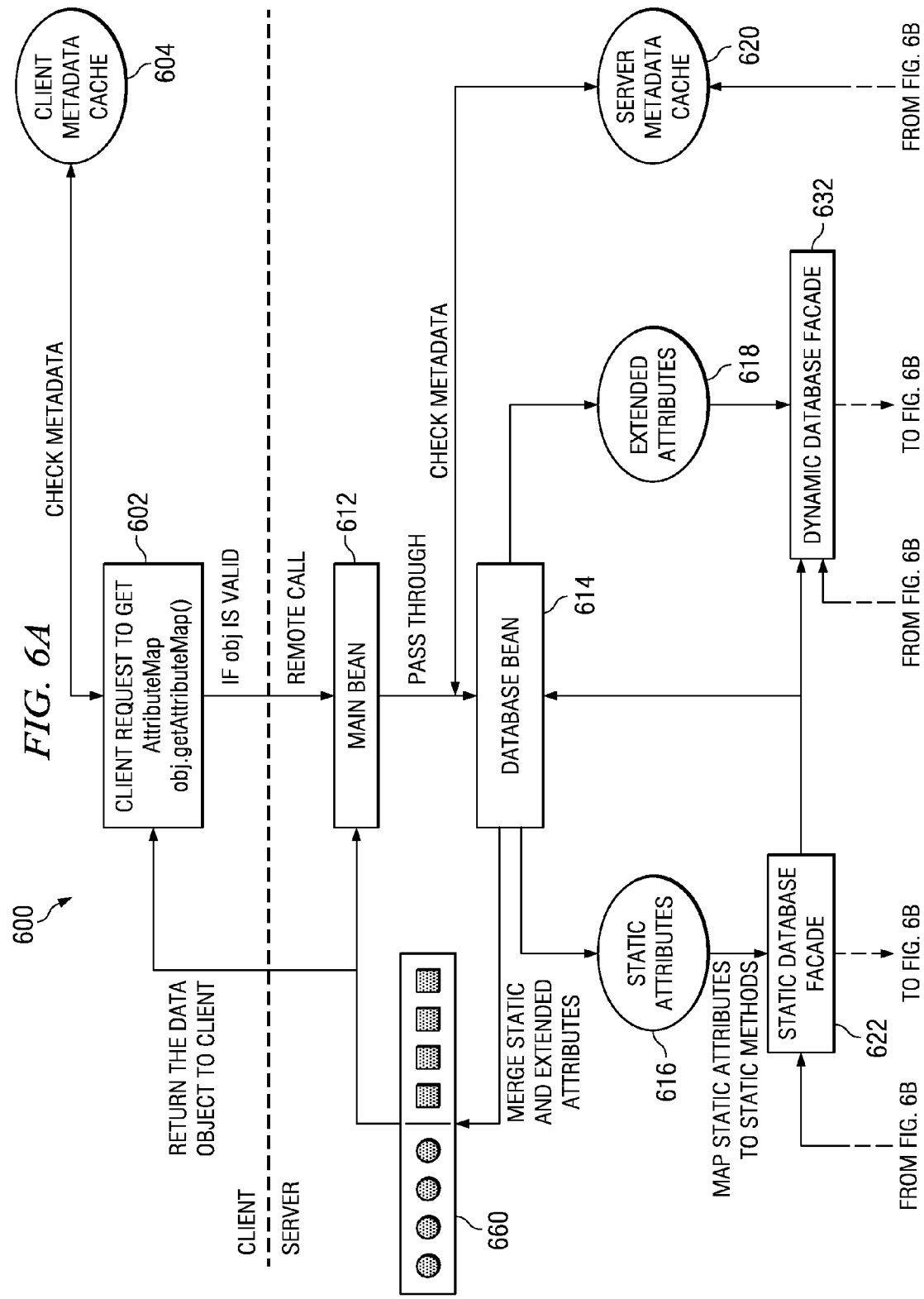
FIGS. 6A and 6B together show a diagram that schematically illustrates a "Get Attribute Map" workflow that includes both static and dynamic attributes according to an exemplary embodiment.
Figure 6B:
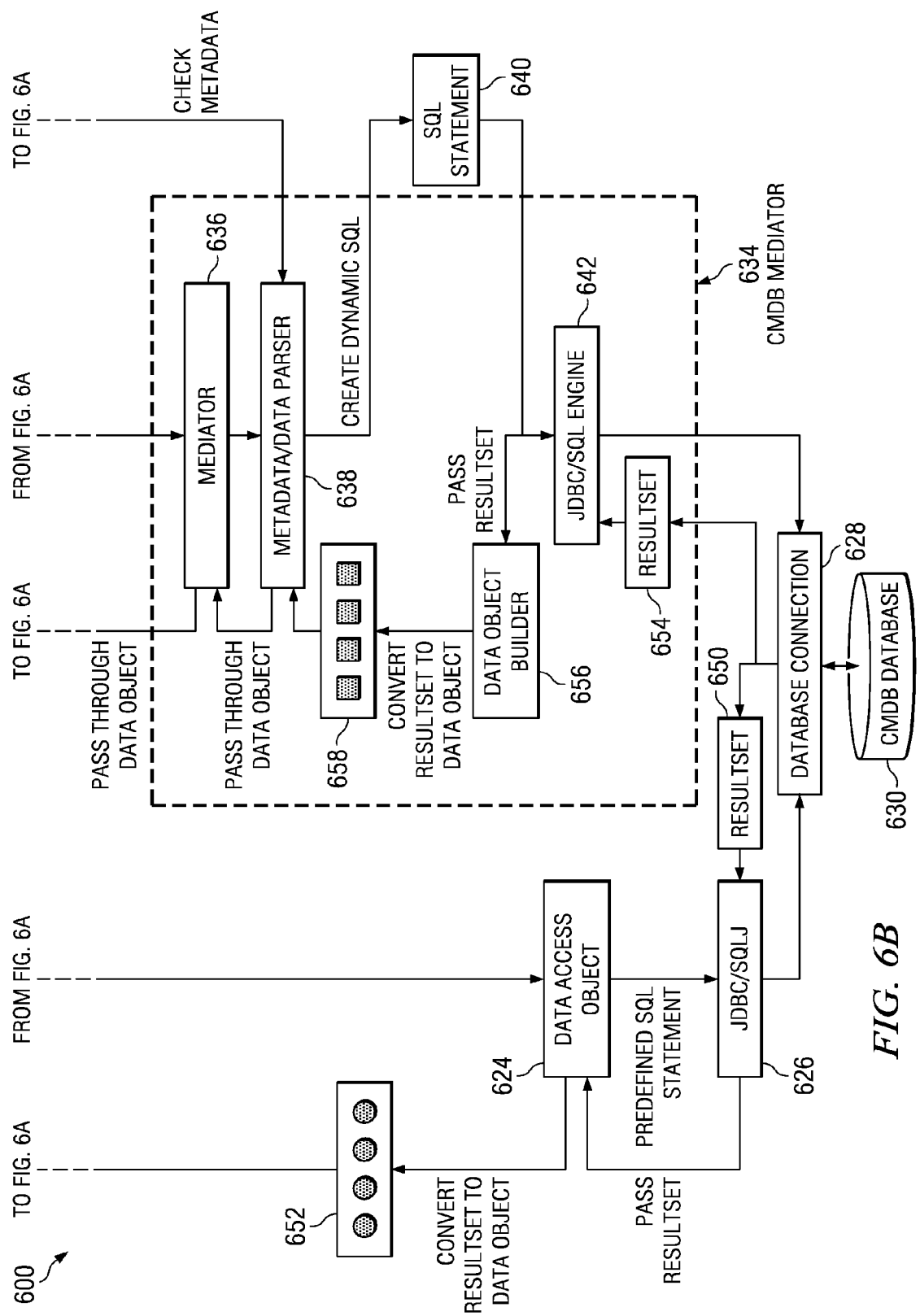

FIGS. 6A and 6B together show a diagram that schematically illustrates a "Get AttributeMap" workflow that includes both static and dynamic attributes according to an exemplary embodiment. The workflow is generally designated by reference number 600, and begins by a client request to get AttributeMap as shown at 602. If the object is determined as valid using client metadata cache 604, the request is received at the server by main bean 612 and is delegated to database bean 614 where it is checked using server metadata cache 620.

The static attributes 616 and the extended attributes 618 are then processed separately. Specifically, Static attributes are processed through static database facade 622 and data access object 624 to define a predefined SQL statement. JDBC/SQLJ 626 takes database actions via database connection 628 to CMDB database 630.

Meanwhile, the extended attributes 618 are processed through dynamic database facade 632 and CMDB mediator 634, including mediator 636, and metadata/data parser 638 to form SQL statement 640. JDBC/SQL engine 642 takes database actions via database connection 628 to CMDB database 630.

The Resultset 650 of the static attribute processing is converted to static data object 652, while the Resultset 654 of the dynamic attribute processing is converted to dynamic data object 658 by data object builder 656. The static and extended data objects are then combined to provide hybrid data object 660 which is returned to the client.

Workflows for creating or updating a data object are similar to the workflows illustrated in FIG. 5 and FIGS. 6A and 6B for searching for a data object. In particular, a "Set Dynamic Attributes" workflow would be the same as the "Get Extended Attribute" workflow of FIG. 5 except that after separately processing the static and dynamic portions, the results of the separate processing are saved in CMDB database 532. In a similar manner, a "Set Hybrid Data Object" workflow that includes both static and dynamic attributes would be that same as the "Get Attribute Map" workflow of FIGS. 6A and 6B except that after separately processing the static and dynamic portions, the results of the separate processing are saved in CMDB database 630.

Figure 7:
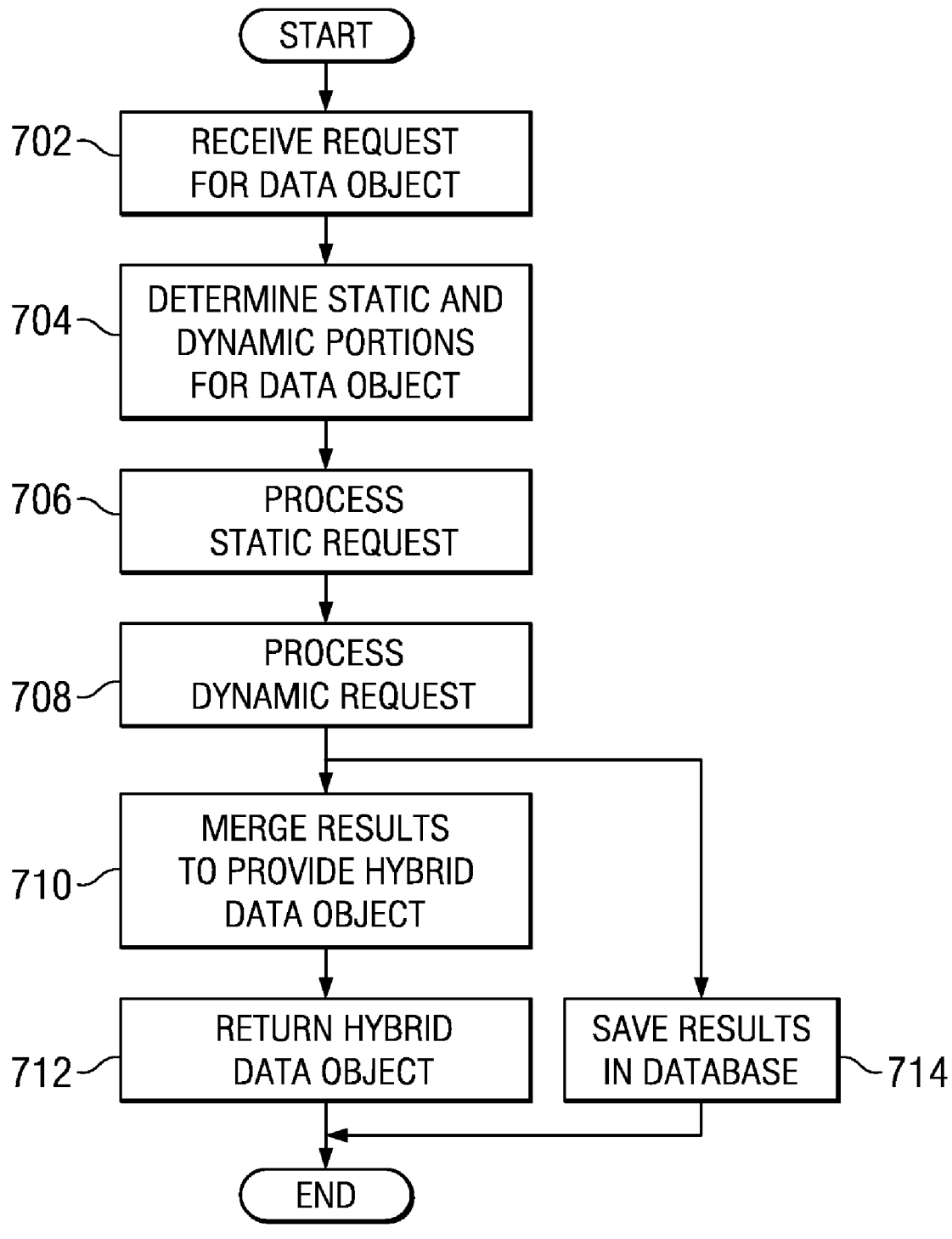
FIG. 7 is a flowchart that illustrates a method for searching for a data object according to an exemplary embodiment.

FIG. 7 is a flowchart that illustrates a method for providing a data object according to an exemplary embodiment. The method begins by receiving at a server a query request from a client for a valid data object (Step 702). A static portion and a dynamic portion for the data object are determined (Step 704), and an instruction for the static portion and an instruction for the dynamic portion are processed separately (Steps 706 and 708). If providing a data object comprises searching for a data object, the results of the static and dynamic processing are merged to form a hybrid data object (Step 710), and the hybrid data object is then returned to the client (Step 712) and the method ends. If providing a data object comprises creating or updating a data object, the method further includes saving a result from processing an instruction for the static portion and a result from processing the instruction for the dynamic portion in a database (step 714), and the method ends.

Exemplary embodiments thus provide a computer implemented method, system and computer usable program code for processing a data object, for example, for searching for, creating or updating a data object. A computer implemented method for processing a data object includes receiving a request for the data object. A static portion and a dynamic portion for the data object are determined, and an instruction for the static portion and an instruction for the dynamic portion are processed separately. To search for a data object, a result from processing an instruction for the static portion and a result from processing the instruction for the dynamic portion are merged to form a hybrid data object. To create or update a data object, a result from processing an instruction for the static portion and a result from processing the instruction for the dynamic portion is saved in a database.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (i) an electronic, magnetic, optical, electromagnetic, infrared, or semiconductor system (or apparatus or device) storage medium or (ii) a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method performed by a computer for providing a data object that is operable for executing a set of instructions contained therein, and used for accessing and updating data in a database, the method comprising:
   the computer receiving a request for the data object;
   the computer determining a static portion and a dynamic portion for the data object; and
   the computer processing separately a predefined instruction for the static portion and a dynamically created instruction for the dynamic portion, wherein providing the data object comprises creating or updating the data object, and wherein the method further comprises saving a result from processing the predefined instruction for the static portion and a result from processing the dynamically created instruction for the dynamic portion in the database.

2. The method of claim 1, wherein the static portion is defined at compilation time of a computer program.

3. The method of claim 1, wherein the dynamic portion is defined at runtime of a computer program.

4. The method of claim 1, wherein processing separately the predefined instruction for the static portion and the dynamically created instruction for the dynamic portion, comprises:
   processing the static portion using a static database facade and processing the dynamic portion using a dynamic database facade.

5. The method of claim 1, wherein the step of processing the dynamically created instruction for the dynamic portion comprises:
   identifying a dynamic attribute;
   identifying at least one instruction for processing the dynamic attribute;
   creating a new instruction that combines the at least one instruction and the dynamic attribute; and
   transmitting the new instruction to the database to obtain the dynamic attribute.

6. The method of claim 1, wherein the database comprises a Configuration Management Database.

7. A method performed by a computer for searching for a data object, the method comprising:
   the computer receiving a request for the data object;
   the computer determining a static portion and a dynamic portion for the data object;
   the computer processing separately an instruction for the static portion and an instruction for the dynamic portion, wherein processing separately an instruction for the static portion and an instruction for the dynamic portion comprises processing the static portion using a static database facade and processing the dynamic portion using a dynamic database facade; and
   the computer merging a result from processing the instruction for the static portion and a result from processing the instruction for the dynamic portion to form a hybrid data object that includes a static data object portion and a dynamic data object portion.

8. The method of claim 7, and further comprising:
   returning the hybrid data object to a requestor.

9. A computer program product, comprising:
   a computer usable, non-transitory storage medium having computer usable program code stored thereon for processing a data object that is operable for executing a set of instructions contained therein, and used for accessing and updating data in a database, the computer program product comprising:
   computer usable program code configured for receiving a request for the data object;
   computer usable program code configured for determining a static portion and a dynamic portion for the data object; and
   computer usable program code configured for processing separately a predefined instruction for the static portion and a dynamically created instruction for the dynamic portion, wherein the computer usable program code configured for providing a data object comprises computer usable program code configured for creating or updating a data object, and further comprising computer usable program code configured for saving a result from processing an instruction for the static portion and a result from processing the instruction for the dynamic portion in the database.

10. The computer program product of claim 9, wherein the static portion is defined at compilation time of a computer program.

11. The computer program product of claim 9, wherein the dynamic portion is defined at runtime of a computer program.

12. The computer program product of claim 9, wherein processing separately the predefined instruction for the static portion and the dynamically created instruction for the dynamic portion, comprises:

computer usable program code configured for processing the static portion using a static database facade and processing the dynamic portion using a dynamic database facade.

13. The computer program product of claim 9, wherein the computer usable program code configured for processing the dynamically created instruction for the dynamic portion comprises:

computer usable program code configured for identifying a dynamic attribute;

computer usable program code configured for identifying at least one instruction for processing the dynamic attribute;

computer usable program code configured for creating a new instruction that combines the at least one instruction and the dynamic attribute; and computer usable program code for transmitting the new instruction to the database to obtain the dynamic attribute.

14. The computer program product of claim 9, wherein the database comprises a Configuration Management Database.

15. A computer program product comprising:

a computer usable, non-transitory storage medium having computer usable program code stored thereon for processing a data object, the computer program product comprising:

computer usable program code configured for receiving a request for the data object;

computer usable program code configured for determining a static portion and a dynamic portion for the data object;

computer usable program code configured for processing separately an instruction for the static portion using a static database facade and an instruction for the dynamic portion using a dynamic database facade; and computer usable program code configured for merging a result from processing an instruction for the static portion and a result from processing the instruction for the dynamic portion to form a hybrid data object that includes a static data object portion and a dynamic data object portion.

16. The computer program product of claim 15, and further comprising:

computer usable program code configured for returning the hybrid data object to a requestor.

17. A data processing system comprising a data processor, a computer memory coupled to the data processor, and a hybrid data object that is operable for executing a set of instructions contained therein, and used for accessing and updating data in a database, the hybrid data object comprising:

a static data object portion, wherein the static data object portion comprises a plurality of static data objects that are defined at compilation time; and a dynamic data object portion, wherein the dynamic data object portion comprises a plurality of dynamic data objects that are defined at runtime when accessing the database, wherein the hybrid data object is stored in the computer memory.

18. The hybrid data object of claim 17, wherein the hybrid data object comprises a Configuration Management Database hybrid data object.

\* \* \* \* \*